United States Patent [19]

Elamin

[11] Patent Number: 5,257,008
[45] Date of Patent: Oct. 26, 1993

[54] COMPRESSED AIR SYSTEM WITH WARNING MECHANISM FOR AIR DRYER SERVICE LIFE INDICATION

[75] Inventor: Naman A. Elamin, Avon, Ohio
[73] Assignee: Allied-Signal Inc., Morristown, N.J.
[21] Appl. No.: 765,853
[22] Filed: Sep. 26, 1991
[51] Int. Cl.⁵ ............................................. G08B 21/00
[52] U.S. Cl. .................... 340/540; 340/602; 340/679
[58] Field of Search ............... 340/632, 603, 602, 604, 340/540, 679; 73/29.02

[56] References Cited

U.S. PATENT DOCUMENTS 3,142,830 7/1964 Patrick et al. ............... 340/602

Primary Examiner—Glen R. Swann, III
Attorney, Agent, or Firm—Ken C. Decker; William N. Antonis

[57] ABSTRACT

A compressed air system includes an air dryer which includes a desiccant for drying compressed air passed through the desiccant before the compressed air is received in a storage reservoir. A humidity sensor is installed in the system downstream of the desiccant for measuring the relatively humidity of the air after it passes through the air dryer. A control module is programmed such that if the humidity level increases above 80%, a timer is started. If a time period of several hours elapses without the humidity level decreasing below 50%, a depleted desiccant and/or a system malfunction is indicated, and an appropriate warning device is actuated.

11 Claims, 2 Drawing Sheets

COMPRESSED AIR SYSTEM WITH WARNING MECHANISM FOR AIR DRYER SERVICE LIFE INDICATION

This invention relates to a compressed air system which uses a desiccant to remove moisture entrained in the compressed air.

BACKGROUND OF THE INVENTION

Compressed air systems are commonly installed on heavy duty vehicles to operate the brakes of the vehicle and other air actuated appliances. It has become increasing common to install an air dryer in such systems to remove the moisture entrained in the compressed air, as moisture can cause system components to freeze and become inoperative during cold weather operation and also because moisture severely reduces the life of many system components. Although the present invention is primarily intended for use with automotive air brake systems, it can also be used with stationary systems, such as those used with industrial machinery, etc.

Common air dryers used in compressed air systems include a desiccant material which removes the moisture entrained in the compressed air. The desiccant must be regenerated or purged periodically by reverse flowing a segregated portion of compressed air through the desiccant to remove the moisture. However, common desiccants may only be used for a limited time, which varies accordingly to a number of factors, including the degree of saturation of the air which has passed through the desiccant and the number of times the desiccant has been purged. Currently, desiccants are replaced at regular intervals. This means that the desiccant is changed more often than necessary in some systems, while in other systems the desiccant should have been replaced earlier.

Summary of the Invention

The present invention warns the system operator of a depleted desiccant which must be replaced, thereby eliminating unnecessary desiccant changes and also alerting the system operator of potential system problems causing early depletion desiccant.

DESCRIPTION OF THE DRAWINGS

These and other advantages of the present invention will become apparent from the following description, with reference to the accompanying drawings, in which.

Detailed Description

Figure 1:
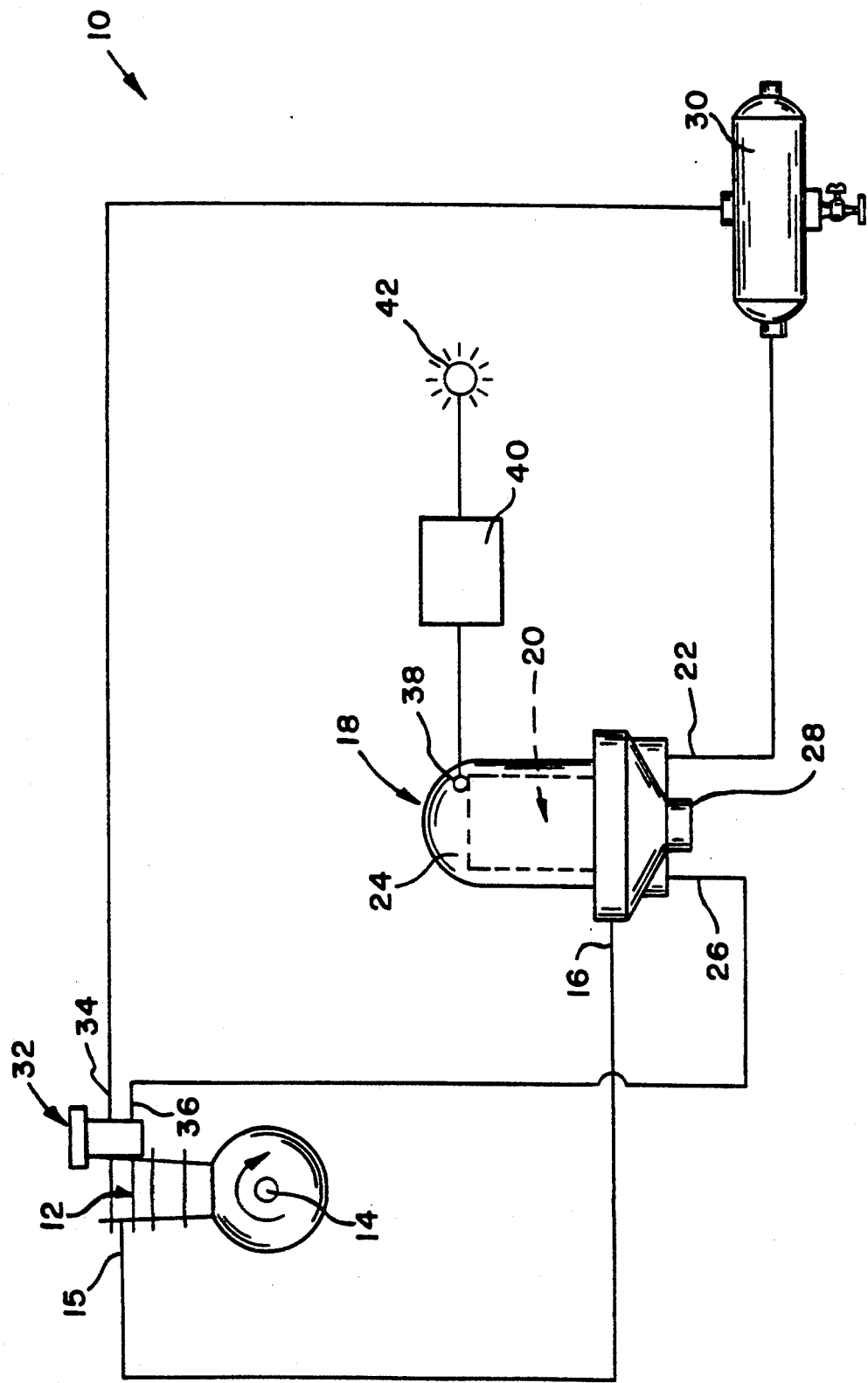
FIG. 1 is a schematic illustration of a compressed air system incorporating the present invention.

Referring now to the drawings, a compressed air system generally indicated by the numeral 10 includes an air compressor 12 having a crankshaft 14 which is turned by, for example, the engine of a vehicle upon which the system 10 is used, or by any other appropriate power source. The compressor 12 compresses ambient air and discharges compressed air through discharge port 15. Discharge port 15 is connected to supply port 16 of a conventional air dryer generally indicated by the numeral 18.

Air dryer 18 includes a desiccant cannister generally indicated by the numeral 20. Compressed air is received at supply port 16 and communicates through a flowpath connecting the supply port 16 with delivery port 22 thereof. The desiccant cannister 20 is within this flowpath, so that air entering supply port 16 flows through desiccant cannister 20 and is then received within a segregated purge volume 24 before communicating with delivery port 22. A conventional purge valve (not shown) within the air dryer 18 is responsive to a pressure signal at control port 26 to reverse flow the compressed air stored in purge volume 24 through the desiccant cannister 20 and then to atmosphere through exhaust port 28. The air dryer 18 is conventional, and will not be described in detail herein. Compressed air is communicated from delivery port 22 into a storage reservoir 30.

The compressor 12 is controlled by a conventional governor generally indicated at 32. Governor 32 has a supply port 34 which is connected to the reservoir 30, and a delivery port 36 which is connected to the control port 26 of the air dryer 18. When the pressure in the reservoir 30 attains a predetermined level, governor 32 responds to this pressure signal at supply port 34 to unload or disable the air compressor 12, and to simultaneously generate a signal at the delivery port 36, which is communicated to the control port 26 of air dryer 18. As discussed above, the air dryer 18 responds to a control signal to purge the air dryer.

As discussed above, the air dryer is capable of removing moisture entrained in the air delivered by the compressor 12 so that the compressed air received in the reservoir 30 has a substantially lower relative humidity level than does the compressed air delivered at delivery port 15 of the air compressor 12. Since the air dryer 18 is purged every time that the compressor is unloaded, the air dryer 18 performs an alternating drying and purging cycles every time that the system 10 is used. The size of the desiccant cannister 20, and the nature of the desiccant material, is such that the air dryer 18 may pass through an indefinite number of drying and purging cycles. However, with continued use, the desiccant in the desiccant cannister 20 eventually becomes spent or depleted and must be replaced. For all these reasons, the desiccant 20 eventually becomes unusable. When this occurs, the desiccant within the cannister 20 is incapable of performing its drying function, and the relative humidity of the compressed air downstream of the desiccant cannister 20, such as in the purge volume 24, the reservoir 30, and in the line communicated to delivery port 22 with the reservoir 30, begins to increase.

According to the invention, a conventional humidity sensor generally indicated by the numeral 38 is installed in the air dryer 18 where the humidity sensor 38 can measure the relatively humidity level of the air within the purge volume 24. Alternatively, the humidity sensor 38 may be installed in, for example, the reservoir 30 or in the line connecting the delivery port 22 with the reservoir 30. The humidity sensor 38 generates an electrical signal which varies in response to the relative humidity level of the compressed air in the purge volume 24. This electrical signal is transmitted to a control module generally indicated by the numeral 40. The control module 40 includes a microprocessor which is programmed in accordance with the flow diagram illustrated in FIG. 2, which will be described in detail hereinafter. The output of the control module 40 is connected to a warning device generally indicated by the numeral 42. The warning device may be, for example, an indicating light on the dashboard of a vehicle if the system 10 is used on an automotive vehicle. The warning device may also be, for example, an audible alarm.

Figure 2:
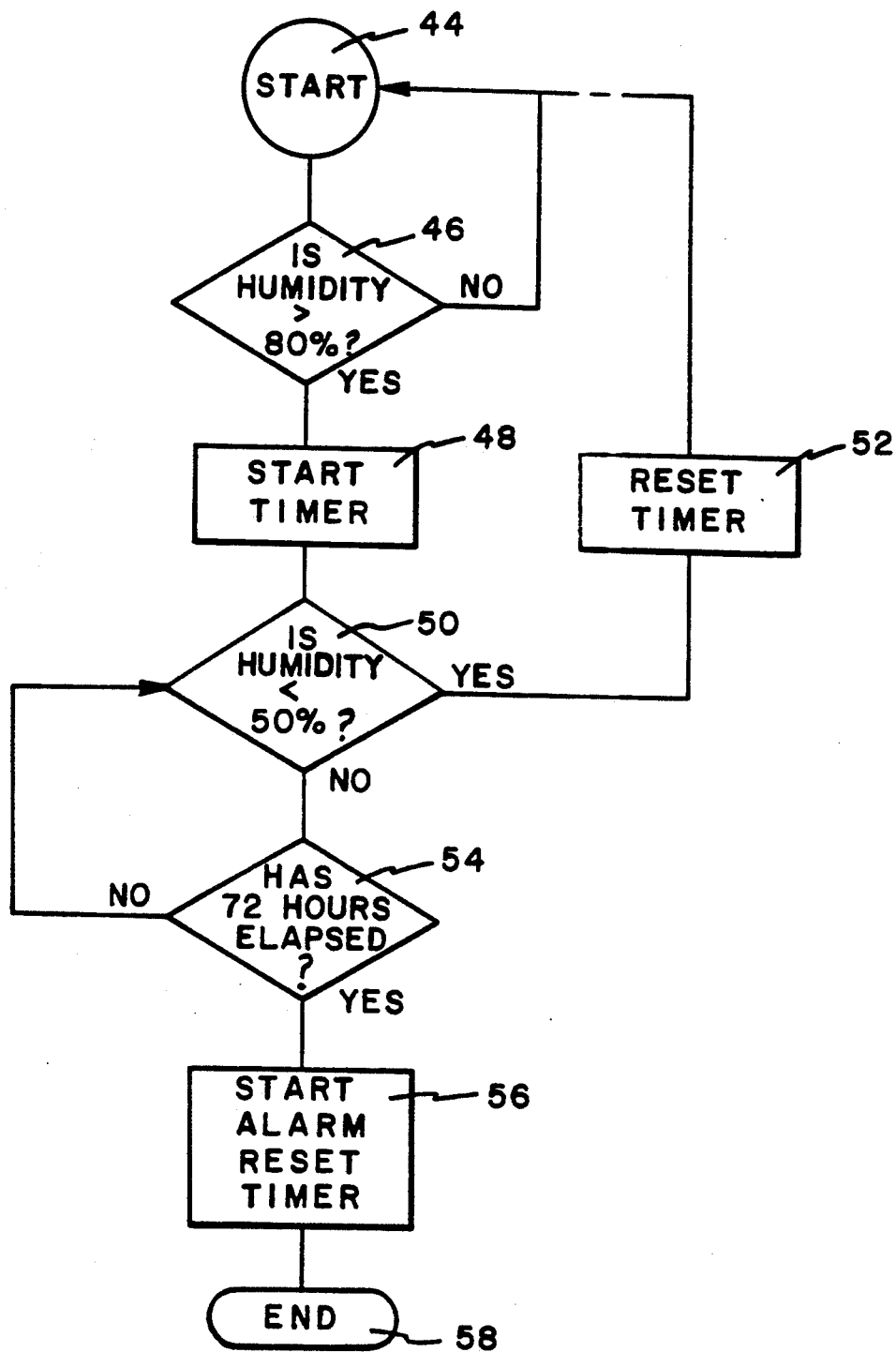
FIG. 2 is a flow diagram of the logic used in the system of FIG. 1 to determine if the desiccant needs to be changed.

Referring now to FIG. 2, the program controlling the warning device 42 is programmed in the microprocessor comprising the control module 40 is started as indicated at 44. The program then checks the humidity level in the purge volume 24, as indicated at 46, to determine if this humidity level is greater than 80% relative humidity. If it is not, the program cycles back to the start at 44. If the relative humidity exceeds 80%, a timer is started, as indicated at 48. The timer 48 is capable of timing the operating hours of the system 10. The program then checks the humidity sensor 38 as indicated at 50 to determine if the humidity level is less than 50%. If the humidity level is less than 50%, the increase in relative humidity to above 80% was temporary, and the fact that the humidity dropped below 50%, means that the desiccant is satisfactory. Accordingly, the timer is reset as indicated at 52 and the program branches back to start at 44. If the humidity remains greater than 50%, the timer is tested as at 54 to determine if 72 hours have elapsed. Until 72 hours have elapsed, the program cycles back to the block 50 repeatedly to perform the relatively humidity test. As long as the relatively humidity remains above 50%, the timer continues running. After 72 hours have elapsed without the relative humidity decreasing below 50%, as indicated at 56, the warning device 42 is activated to warn the operator that the desiccant within the air dryer 18 should be replaced. The program end is indicated at 58.

Although the warning device 42, when actuated, will usually indicate a depleted desiccant, the warning device 42 will also be actuated when other malfunctions occur. For example, if there is excessive system leakage, the compressor will be loaded continually, so that the air dryer 18 will become saturated and thus will be ineffective in drying the compressed air. However, this is because the air dryer has not been purged due to the fact that the compressor is being continually loaded. The warning device 42 will be actuated, because the humidity level in the compressed air downstream of the desiccant has increased above the predetermined level of, for example, 80%, and has not dropped below the predecided humidity level of 50% during the 72 hour period timed by the timer of control module 40. Similarly, the dryer 18 may malfunction, such as, for example, the purge valve (not shown) which responds to the signal at control port 26 becoming stuck or inoperative. In this case, the air dryer again will not be purged even though the desiccant is satisfactory condition. Nonetheless, the humidity level down stream of the desiccant will be such that the warning device 42 will be actuated as described above. In any event, the operator will be warned of a system malfunction or a depleted desiccant.

I claim:

1. Compressed air system including a warning mechanism for warning that the desiccant within an air dryer for drying the compressed air should be replaced, comprising a compressed air source, and a storage reservoir for receiving compressed air, said air dryer having an inlet connected to said source, an outlet connected to said reservoir, and a flowpath between said inlet and outlet, said desiccant being located in said flowpath, a warning device, and control means for establishing the condition of the compressed air downstream of the desiccant and actuating said warning device when the conditions of the compressed air downstream of the desiccant are indicative of a nearly depleted desiccant that should be replaced or of a system malfunction.

2. Compressed air system as claimed in claim 1, further including means for determining the relative humidity of the compressed air downstream of the desiccant, said control means determining if the relative humidity level increases above a predetermined level, and further determining when a predetermined time period has elapsed and actuating the warning device after said predetermined time period has elapsed after the relative humidity sensed by the humidity determining means exceeds the predetermined level.

3. Compressed air system as claimed in claim 2, wherein said control means resets said predetermined time period so that said warning device is not activated if the relative humidity sensed by the humidity determining means drops below a predecided humidity level before said time period has expired.

4. Compressed air system as claimed in claim 3, wherein said predecided humidity level is less than the predetermined humidity level.

5. Compressed air system as claimed in claim 1, further including means for determining the relative humidity of the compressed air downstream of the desiccant, said control means comparing said relative humidity with a predetermined level, for determining if the condition of the compressed air downstream of the dryer is indicative of a depleted desiccant.

6. Compressed air system as claimed in claim 5, wherein said control means determines when a predetermined time period has elapsed, and actuate said warning device only after said predetermined time period has elapsed after the humidity determining means has established that the relative humidity of the compressed air downstream of the desiccant exceeds said predetermined level.

7. Compressed air system as claimed in claim 6, wherein said control means resets said predetermined time period so that said warning device is not activated if the humidity determining means establishes that the relative humidity of the compressed air downstream of the desiccant drops below a predecided level before said predetermined time period has elapsed.

8. Method of warning the operator of a compressed air system that the desiccant within an air dryer for drying the compressed air should be replenished, said compressed air system comprising a compressed air source, and a storage reservoir for receiving compressed air, said air dryer having an inlet connected to said source, an outlet connected to said reservoir, and a flowpath between said inlet and outlet, said desiccant being located in said flowpath, comprising the steps of establishing the condition of the compressed air downstream of the desiccant and actuating a warning device when the condition of the compressed air downstream of the desiccant is indicative of a nearly depleted desiccant that should be replaced or of a system malfunction.

9. Method as claimed in claim 8, further including the steps of determining the relative humidity of the compressed air downstream of the desiccant, and using the humidity to establish the condition of the compressed air.

10. Method as claimed in claim 9, further including the steps of comparing the humidity of the compressed air downstream of the desiccant with a predetermined humidity level, and starting a timer when said humidity level the humidity of the air downstream of the desiccant exceeds said predetermined level, and actuating the warning device when a predetermined time period has expired.

11. Method as claimed in claim 10, further including the step of resetting said timer so that said warning device is not activated if the humidity level of the compressed air downstream of the desiccant drops below a predecided humidity level after said timer has been started but before said predetermined time period has expired.

* * * * *